Figure 1:
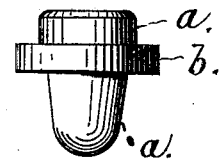

H. BARRETT & J. BAILEY.
Internal Bottle-Stopper.

No. 214,987.  Patented May 6, 1879.

WITNESSES  
INVENTORS

UNITED STATES PATENT OFFICE.

HENRY BARRETT, OF HAMPTON, AND JOHN BAILEY, OF SILVERTOWN, ENGLAND.

IMPROVEMENT IN INTERNAL BOTTLE-STOPPERS.

Specification forming part of Letters Patent No. 214,987, dated May 6, 1879; application filed December 23, 1878.

*To all whom it may concern:*

Be it known that we, HENRY BARRETT, of Hampton, in the county of Middlesex, England, and JOHN BAILEY, of Silvertown, in the county of Essex, England, have invented certain Improvements in the Manufacture of Stoppers for Bottles for containing aerated or gaseous liquids, of which the following is a specification.

This invention relates to improvements in that class of internal stoppers for bottles for containing aerated or gaseous liquids which have hitherto been made of a stem or body of hard non-elastic india-rubber known as "vulcanite" or "ebonite" and a washer of soft elastic vulcanized india-rubber, the stem or body of such stopper being molded or formed with a recess for receiving the india-rubber washer.

Now, the object of our improvements is to obviate many of the inconveniences resulting from the stoppers being formed in two such separate pieces; and among the objections to such stoppers may be mentioned the following—videlicet, any small mechanical faults, either in the recess in the hard-rubber or in the soft vulcanized india-rubber washer, will cause a leakage of the gas in the bottle, and thereby render the liquid useless; there is great liability of tearing the soft-rubber washer in stretching it over the ebonite or vulcanite stem or body to fit it into the recess; and there is also the inconvenience of the stopper itself being in two parts which require to be fitted together to complete the stopper; and this invention consists in avoiding these objections by making the stopper with a hard-rubber, ebonite, or vulcanized gutta-percha stem or body, and with a soft india-rubber washer, such body and washer being consolidated or united into a single piece.

In carrying out our invention, we form or fashion the body or stem of the stopper of ebonite dough—that is, dough intended to form ebonite, a material that is well known— and partially vulcanize it—that is to say, subject it to sufficient heat only to convert it into soft or semi-hard rubber. We then remove it from the vulcanizing or curing vessel; and we then place the washer made of soft dough, and intended to be afterward vulcanized, in the recess in the semi-hard stem or body, and we then place the article consisting of the combined parts either in a mold or not in the vulcanizing or curing vessel, and, after being subjected to sufficient heat, the stopper is removed and the body will be of hard rubber—that is to say, ebonite or vulcanite—and the washer of soft elastic rubber, the parts being united in the last vulcanizing process, so that we thus obtain a stopper with a vulcanized washer and an ebonite or hard-rubber stem complete in one piece.

Figure 2:
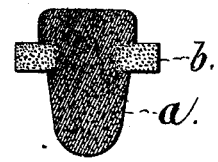

Figure 1 illustrates an elevation of a stopper made in accordance with our invention, and Fig. 2 a central longitudinal section of the same.

In both figures, *a* indicates the hard body or stem, and *b* the soft-rubber washer, these two parts being made into one by the vulcanizing process.

Or, we form the body of ebonite-dough having the requisite amount of sulphur to convert it into ebonite, and the washer of dough having a less quantity of sulphur for soft vulcanizing, and in the soft state we put the article into a mold and subject it to heat in the vulcanizing or curing vessel and vulcanize it, and when complete the stem formed of ebonite-dough is converted into hard rubber or ebonite, and the washer portion is converted into soft vulcanized india-rubber; or we partially vulcanize the washer portion of the stopper and fit it on either a hard or semi-hard stem or body, and then complete the vulcanization.

There are other ways of carrying out the operation.

The head of the stopper may be loaded or not, as hitherto; and, instead of ebonite or vulcanite, we may use gutta-percha and sulphur vulcanized for the stem or body.

Having thus described our said invention, we would have it understood that we do not claim any particular mode of making or vulcanizing the two parts of the stopper together; but What we do claim is—

The improved internal stopper described, composed of a stem, *a*, of hard rubber or ebonite or vulcanized gutta-percha, and a washer, *b*, of soft elastic vulcanized rubber, combined or consolidated into a single piece, as set forth.

H. BARRETT.
JNO. BAILEY.

Witnesses:
G. F. REDFERN,
A. ALBERTO.